United States Patent
Isitman et al.

(10) Patent No.: US 9,441,098 B1
(45) Date of Patent: Sep. 13, 2016

(54) TIRE WITH TREAD FOR LOW TEMPERATURE PERFORMANCE AND WET TRACTION

(71) Applicant: The Goodyear Tire & Rubber Company, Akron, OH (US)

(72) Inventors: Nihat Ali Isitman, Ettelbruck (LU); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/944,322

(22) Filed: Nov. 18, 2015

(51) Int. Cl.
*C08L 9/00* (2006.01)
*C08K 3/04* (2006.01)
*C08K 3/36* (2006.01)

(52) U.S. Cl.
CPC ............ *C08L 9/00* (2013.01); *C08L 2205/025* (2013.01); *C08L 2205/03* (2013.01)

(58) Field of Classification Search
CPC .............. C08L 9/00; C08K 3/04; C08K 3/36
USPC ......................................................... 524/526
See application file for complete search history.

(56) References Cited

U.S. PATENT DOCUMENTS

| | | | |
|---|---|---|---|
| 5,696,197 A | 12/1997 | Smith et al. | 524/495 |
| 5,773,504 A | 6/1998 | Smith et al. | 524/492 |
| 6,121,367 A | 9/2000 | Corvasce et al. | 524/492 |
| 6,355,719 B1 | 3/2002 | Corvasce et al. | 524/492 |
| 6,429,245 B1 * | 8/2002 | Francik | B60C 1/0016 152/450 |

* cited by examiner

*Primary Examiner* — Vu A Nguyen
(74) *Attorney, Agent, or Firm* — Henry C. Young, Jr.

(57) ABSTRACT

This invention relates to a tire for promoting a combination of winter service at low temperatures and for promoting wet traction with tread of rubber composition containing blend of high Tg and low Tg synthetic elastomers. The high Tg elastomer is comprised of high vinyl polybutadiene rubber and the low Tg elastomer is comprised of cis 1,4-polybutadiene rubber.

18 Claims, No Drawings

TIRE WITH TREAD FOR LOW TEMPERATURE PERFORMANCE AND WET TRACTION

FIELD OF THE INVENTION

This invention relates to a tire with a tread of a rubber composition that promotes a combination of winter traction at low temperatures and for promoting wet traction. The tread rubber composition contains a combination of high and low glass transition temperature (Tg) synthetic elastomers. The high Tg elastomer is comprised of high vinyl polybutadiene rubber and the low Tg elastomer is comprised of a low vinyl polybutadiene rubber.

BACKGROUND OF THE INVENTION

Tires are sometimes desired with treads for promoting traction on wet surfaces. Various rubber compositions may be proposed for such tire treads.

For example, tire tread rubber compositions which contain high molecular weight, high Tg (high glass transition temperature) diene based synthetic elastomer(s) might be desired for such purpose particularly for wet traction (traction of tire treads on wet road surfaces). Such tire tread may be desired where its reinforcing filler is primarily precipitated silica with its reinforcing filler therefore considered as being precipitated silica rich.

In one embodiment, the improved predictive wet traction performance for the tread rubber composition is based on a maximization of its tan delta physical property at 0° C.

However, it is also desired to provide such tread rubber composition containing the high Tg elastomer for wet traction with a lower stiffness at lower temperatures to promote cold weather winter performance, particularly for vehicular snow driving.

In one embodiment, the predictive cold weather performance for the tread rubber composition is based on a minimization of its stiffness physical property at −30° C. (e.g. minimized storage modulus E').

Therefore, it desirable to provide such vehicular tire tread with a rubber composition containing both high and low Tg elastomers with an optimized (maximized) tan delta property at 0° C. (for predictive wet traction performance improvement) combined with an optimized (minimized) stiffness property at −30° C. (for predictive cold weather performance improvement).

It is considered that significant challenges are presented for providing such tire tread rubber compositions that provide a combination of both wet traction and winter performance. To achieve the challenge of providing such balance of tread rubber performances with tread rubber compositions, it is recognized that concessions and adjustments would be expected.

To meet such challenge, it is desired to evaluate:

(A) utilizing a high vinyl polybutadiene rubber with a high Tg, (B) utilizing a low vinyl polybutadiene rubber with a low Tg, (C) providing an inclusion of a traction promoting resin in the tread rubber composition to aid in promoting wet traction for the tread, and (D) reinforcing filler containing a high content of precipitated silica to also promote wet traction for the tire tread rubber composition.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

The glass transition temperature (Tg) of the elastomers may be determined by DSC (differential scanning calorimetry) measurements at a temperature rising rate of about 10° C. per minute, as would be understood and well known by one having skill in such art. The softening point of a resin may be determined by ASTM E28 which might sometimes be referred to as a ring and ball softening point.

SUMMARY AND PRACTICE OF THE INVENTION

In accordance with this invention, a pneumatic tire is provided having a circumferential rubber tread intended to be ground-contacting, where said tread is a rubber composition comprised of, based on parts by weight per 100 parts by weight elastomer (phr):

(A) 100 phr of conjugated diene-based elastomers comprised of;

(1) about 25 to about 75 phr of a high vinyl polybutadiene rubber having a Tg in a range of from about −40° C. to about −10° C. and an isomeric vinyl 1,2-content in a range of from about 70 to about 85 percent, (2) about 75 to about 25 phr of a low vinyl polybutadiene rubber having a Tg in a range of from about −108° C. to about −90° C. and an isomeric vinyl 1,2-content in a range of from about 0 to about 15 percent, provided that the ratio of low vinyl to high vinyl polybutadienes is at least 1/1 and alternately at least 1.5/1, (B) about 80 to about 200, alternately from about 100 to about 160, phr of rubber reinforcing filler comprised of a combination of precipitated silica (amorphous synthetic precipitated silica) and rubber reinforcing carbon black in a ratio of precipitated silica to rubber reinforcing carbon black of at least 9/1, together with silica coupling agent having a moiety reactive with hydroxyl groups (e.g. silanol groups) on said precipitated silica and another different moiety interactive with said diene-based elastomers, and (C) about 10 to about 60, alternately from about 10 to about 40, phr of a traction promoting resin (e.g. traction between said tread and ground) comprised of at least one of styrene-alphamethylstyrene resin, coumarone-indene resin, petroleum hydrocarbon resin, terpene polymer, terpene phenol resin, rosin derived resin and copolymers wherein such resins desirably have a softening point (ASTM E28) in a range of from about 60° C. to about 150° C.

In additional accordance with this invention, said tread rubber composition is exclusive of styrene containing elastomers.

In further accordance with this invention, said tire tread is provided as a sulfur cured rubber composition.

In one embodiment said tread rubber composition further contains up to 25, alternately up to about 15, phr of at least one additional diene based elastomer exclusive of styrene containing elastomers. Such additional elastomer may be comprised of, for example, at least one of cis 1,4-polyisoprene (natural rubber or synthetic), and copolymers of isoprene and butadiene.

In one embodiment, said precipitated silica and silica coupling agent may be pre-reacted to form a composite thereof prior to their addition to the rubber composition.

In one embodiment, said precipitated silica and silica coupling agent may be added to the rubber composition and reacted together in situ within the rubber composition.

The traction promoting resin is desirably comprised of at least one of styrene-alphamethylstyrene resin, coumarone-indene resin, petroleum hydrocarbon resin, terpene polymer, terpene phenol resin and rosin derived resin and copolymers.

In one embodiment, the resin is a styrene/alphamethylstyrene resin. Such styrene/alphamethylstyrene resin may be, for example, a relatively short chain copolymer of styrene and alphamethylstyrene. In one embodiment, such a resin may be suitably prepared, for example, by cationic copolymerization of styrene and alphamethylstyrene in a hydrocarbon solvent. The styrene/alphamethylstyrene resin may have, for example, a styrene content in a range of from about 10 to about 90 percent. The styrene/alphamethylstyrene resin may have a softening point, for example, in a range of from about 60° C. to about 125° C., alternately from about 80° C. to 90° C. (ASTM E28). A suitable styrene/alphamethylstyrene resin may be, for example, Resin 2336™ from Eastman or Sylvares SA85™ from Arizona Chemical.

In one embodiment, the resin is a coumarone-indene resin. Such coumarone-indene resin may have a softening point, for example, in a range of from about 60° C. to about 150° C. containing coumarone and indene as the monomer components making up the resin skeleton (main chain). Minor amounts of monomers other than coumarone and indene may be incorporated into the skeleton such as, for example, methyl coumarone, styrene, alphamethylstyrene, methylindene, vinyltoluene, dicyclopentadiene, cycopentadiene, and diolefins such as isoprene and piperlyene.

In one embodiment, the resin is a petroleum hydrocarbon resin. Such petroleum hydrocarbon resin may be, for example, an aromatic and/or nonaromatic (e.g. paraffinic) based resin. Various petroleum resins are available. Some petroleum hydrocarbon resins have a low degree of unsaturation and high aromatic content, whereas some are highly unsaturated and yet some contain no aromatic structure at all. Differences in the resins are largely due to the olefins contained in the petroleum based feedstock from which the resins are derived. Conventional olefins for such resins include any C5 olefins (olefins and diolefines containing an average of five carbon atoms) such as, for example, cyclopentadiene, dicyclopentadiene, isoprene and piperylene, and any C9 olefins (olefins and diolefins containing an average of 9 carbon atoms) such as, for example, vinyltoluene and alphamethylstyrene. Such resins may be made from mixtures of such C5 and C9 olefins.

In one embodiment, said resin is a terpene resin. Such resin may be comprised of, for example, polymers of at least one of limonene, alpha pinene and beta pinene and having a softening point in a range of from about 60° C. to about 160° C.

In one embodiment, the resin is a terpene-phenol resin. Such terpene-phenol resin may be, for example, a copolymer of phenolic monomer with a terpene such as, for example, limonene and pinene.

In one embodiment, the resin is a resin derived from rosin and derivatives. Representative thereof are, for example, gum rosin and wood rosin. Gum rosin and wood rosin have similar compositions, although the amount of components of the rosins may vary. Such resins may be in the form of esters of rosin acids and polyols such as pentaerythritol or glycol.

In one embodiment, said resin may be partially or fully hydrogenated.

The precipitated silica reinforcement may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

Various commercially available precipitated silicas may be used, such as, and not intended to be limiting, silicas from PPG Industries under the Hi-Sil trademark with designations 210, 243, 315, etc.; silicas from Solvay with, for example, designations of Zeosil 1165MP and Zeosil 165GR; silicas from Evonik with, for example, designations VN2 and VN3; and chemically treated (pre-hydrophobated) precipitated silicas such as for example Agilon™ 400 from PPG.

Representative examples of rubber reinforcing carbon blacks are, for example, and not intended to be limiting, are referenced in *The Vanderbilt Rubber Handbook*, 13$^{th}$ edition, year 1990, on Pages 417 and 418 with their ASTM designations. As indicated, such rubber reinforcing carbon blacks may have iodine absorptions ranging from, for example, 60 to 240 g/kg and DBP values ranging from 34 to 150 cc/100 g.

Representative of silica coupling agents for the precipitated silica are comprised of, for example;

(A) bis(3-trialkoxysilylalkyl) polysulfide containing an average in range of from about 2 to about 4, alternatively from about 2 to about 2.6 or from about 3.2 to about 3.8, sulfur atoms in its polysulfide connecting bridge, or (B) an organoalkoxymercaptosilane, or (C) their combination.

Representative of such bis(3-trialkoxysilylalkyl) polysulfide is comprised of bis(3-triethoxysilylpropyl) polysulfide.

It is readily understood by those having skill in the art that the vulcanizable rubber composition would be compounded by methods generally known in the rubber compounding art. In addition, said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.2 to 6 phr being often more desirable. Typical amounts of processing aids for the rubber composition, where used, may comprise, for example, from about 1 to about 10 phr. Typical processing aids may be, for example, at least one of various fatty acids (e.g. at least one of palmitic, stearic and oleic acids) or fatty acid salts.

Rubber processing oils may be used, where desired, in an amount of, for example, from about 10 up to about 100, alternately from about 15 to about 45 phr, to aid in processing the uncured rubber composition. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, and vegetable oils such as sunflower, soybean, and safflower oils.

Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid comprise about 0.5 to about 5 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 2.5, phr. In another embodiment, combinations of a primary and a secondary accelerator might be used with the secondary accelerator being used in smaller amounts, such as, for example, from about 0.05 to about 4 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The pneumatic tire of the present invention may be, for example, a passenger tire, truck tire, a race tire, aircraft tire, agricultural tire, earthmover tire and off-the-road tire. Usually desirably the tire is a passenger or truck tire. The tire may also be a radial or bias ply tire, with a radial ply tire being usually desired.

Vulcanization of the pneumatic tire containing the tire tread of the present invention is generally carried out at conventional temperatures in a range of, for example, from about 140° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following example is presented for the purposes of illustrating and not limiting the present invention. The parts and percentages are parts by weight, usually parts by weight per 100 parts by weight rubber (phr) unless otherwise indicated.

EXAMPLE I

In this example, exemplary rubber compositions for a tire tread were prepared for evaluation for use to promote a combination of wet traction and cold weather (winter) performance.

A control rubber composition was prepared identified as rubber Sample A as a precipitated silica reinforced rubber composition containing synthetic elastomers as a combination of styrene/butadiene rubber having an intermediate Tg of about −60° C. and a cis 1,4-polybutadiene rubber having a low Tg of about −106° C. together with a traction resin and silica coupler for the precipitated silica.

Experimental rubber compositions were prepared as rubber Samples B through D as precipitated silica reinforced rubber compositions containing synthetic elastomers as a combination of high vinyl polybutadiene rubber having an isometric vinyl content of about 77 percent and a Tg of about −30° C. (replacing the styrene/butadiene rubber of Control rubber Sample A) and cis 1,4-polybutadiene rubber having a isometric vinyl content of less than 4 percent and cis 1,4-content of more than 96 percent and a low Tg of about −106° C. together with a traction resin and silica coupler for the precipitated silica.

The rubber compositions are illustrated in the following Table 1.

TABLE 1

|  | Parts by Weight (phr) | | | |
| --- | --- | --- | --- | --- |
| Material | Control Sample A | Exp'l Sample B | Exp'l Sample C | Exp'l Sample D |
| Styrene/butadiene rubbers[1] | 75 | 0 | 0 | 0 |
| High vinyl polybutadiene rubber[2] | 0 | 65 | 50 | 35 |
| Cis 1,4-polybutadiene rubber (low vinyl)[3] | 25 | 35 | 50 | 65 |

TABLE 1-continued

|  | Parts by Weight (phr) | | | |
|---|---|---|---|---|
| Material | Control Sample A | Exp'l Sample B | Exp'l Sample C | Exp'l Sample D |
| Traction resin[4] | 36 | 36 | 36 | 36 |
| Rubber processing oils[5] | 26 | 26 | 26 | 26 |
| Precipitated silica[6] | 140 | 140 | 140 | 140 |
| Silica coupler[7] | 8.8 | 8.8 | 8.8 | 8.8 |
| Fatty acids[8] | 5 | 5 | 5 | 5 |
| Carbon black (N330) | 1 | 1 | 1 | 1 |
| Wax (paraffinic and microcrystalline) | 1.5 | 1.5 | 1.5 | 1.5 |
| Antioxidants | 5 | 5 | 5 | 5 |
| Zinc oxide | 2.5 | 2.5 | 2.5 | 2.5 |
| Sulfur | 1.2 | 1.5 | 1.5 | 1.5 |
| Sulfur cure accelerators[9] | 5.7 | 5.7 | 5.7 | 5.7 |

[1] A styrene/butadiene rubber having a styrene content of about 14 percent and a vinyl content of about 38 percent with a Tg of about −60° C. and Mooney viscosity (ML1+4) of about 65 as SSBR LSLV-60 ™ from ENI Versalis
[2] High vinyl polybutadiene rubber as Europrene BR HV80 ™ from ENI Versalis having a Tg of about −30° C. and an isometric microstructure comprised of a vinyl 1,2- content of about 77 percent
[3] High cis 1,4-polybutadiene rubber (low vinyl) as Budene1229 ™ from The Goodyear Tire & Rubber Company having a Tg of about −106° C. having a vinyl 1,2-content of less than about 4 percent and a cis 1,4-content of more than about 96 percent
[4] Traction resin as styrene-alphamethylstyrene copolymer having a softening point in a range of about 80° C. to 90° C. (ASTM E28) obtained as Sylvares SA85 ™ from Arizona Chemicals
[5] Rubber processing oil as a TDAE type petroleum based oil
[6] Precipitated silica as HiSil1315G-D ™ from PPG.
[7] Silica coupler comprised of a bis(3-triethoxysilylpropyl) polysulfide containing an average in a range of from about 2 to about 2.6 connecting sulfur atoms in its polysulfidic bridge as Si266 from Evonik
[8] Fatty acids comprised of stearic, palmitic and oleic acids
[9] Sulfur cure accelerators as sulfenamide primary accelerator and diphenylguanidine secondary accelerator The rubber Samples were prepared by blending the ingredients, other than the sulfur curatives, in a first non-productive mixing stage (NP1) in an internal rubber mixer for about 4 minutes to a temperature of about 160° C. The resulting mixtures were subsequently individually mixed in a second sequential non-productive mixing stage (NP2) in an internal rubber mixer to a temperature of about 140° C. The rubber compositions were subsequently mixed in a productive mixing stage (P) in an internal rubber mixer with the sulfur curatives comprised of the sulfur and sulfur cure accelerators for about 2 minutes to a temperature of about 115° C. The rubber compositions were each removed from the internal mixer after each mixing step and cooled to below 40° C. between each individual non-productive mixing stage and before the final productive mixing stage.

The following Table 2 illustrates cure behavior and various physical properties of rubber compositions based upon the basic formulation of Table 1 and reported herein as Control rubber Sample A and Experimental rubber Samples B through D. Where cured rubber samples are reported, such as for the stress-strain, hot rebound and hardness values, the rubber samples were cured for about 10 minutes at a temperature of about 170° C.

To establish the predictive wet traction, a tangent delta (tan delta) test was run at 0° C.

To establish the predictive low temperature (winter snow) performance, the rubber's stiffness test (storage modulus E') was run at −30° C. to provide a stiffness value of the compounds (rubber compositions) at lower operating temperatures.

TABLE 2

|  | Parts by Weight (phr) | | | |
|---|---|---|---|---|
| Materials | Control A | Exp. B | Exp. C | Exp. D |
| Styrene/butadiene rubber | 75 | 0 | 0 | 0 |
| High vinyl polybutadiene rubber | 0 | 65 | 50 | 35 |
| Cis 1,4-polybutadiene rubber (low vinyl) | 25 | 35 | 50 | 65 |
| Ratio of low/high vinyl polybutadienes | N/A | 0.5/1 | 1/1 | 1.9/1 |
| Properties | | | | |
| Wet Traction Laboratory Prediction | | | | |
| Tan delta, 0° C. (higher is better) | 0.55 | 0.75 | 0.66 | 0.57 |
| Cold Weather (Winter) Performance (Stiffness) Laboratory Prediction | | | | |
| Storage modulus (E'), (MPa) at −30° C., 10 Hertz, 0.25% strain (lower stiffness values are better) | 149 | 334 | 186 | 123 |

TABLE 2-continued

| Materials | Parts by Weight (phr) | | | |
|---|---|---|---|---|
| | Control A | Exp. B | Exp. C | Exp. D |
| Rolling Resistance (RR) Laboratory Prediction | | | | |
| Rebound at 100° C., percent | 51 | 50 | 48 | 51 |
| Additional properties | | | | |
| Tensile strength (MPa) | 13 | 10 | 12 | 11 |
| Elongation at break (%) | 520 | 340 | 450 | 470 |
| Modulus (ring) 300% (MPa) | 6.4 | 7.4 | 7.5 | 6.8 |
| Shore A hardness (100° C.) | 66 | 65 | 68 | 66 |
| DIN abrasion loss, cc (lower is better)[1] | 128 | 200 | 163 | 133 |

[1]DN53516, relative volume loss (relative to a control)

From Table 2 it is observed that Experimental sample D has wet traction predicted to be equal to Control sample A based on the tan delta property at 0° C., and also similar predicted rolling resistance based on the rebound properties and tread wear resistance based on the abrasion resistance properties compared to Control sample A. The other Experimental samples B and C appear to also have equal to better wet traction and equal predictive rolling resistance (rebound) properties, but somewhat worse tread wear resistance (abrasion resistance) prediction.

From Table 2 it is further observed that Experimental Sample D, based on lower E' stiffness than Sample A at −30° C., which is predictive of better winter performance, whereas samples B and C would exhibit worse predictive winter performance than control Sample A, based on higher E' values at −30° C.

It is concluded that Experimental Sample D with a combination of 65 phr of low vinyl and 35 phr of high vinyl polybutadiene rubber provides a combination of predictive wet traction (tan delta at 0° C.), rolling resistance (rebound) and tread wear resistance (abrasion resistance) properties similar to Control Sample A, with, however, a significant unpredicted, and therefore discovered, predictive improvement in winter tread performance, based on significantly lower E' stiffness at −30° C.

It is further concluded that the high vinyl polybutadiene rubber may be used in a range of from about 25 to about 75 phr of the rubber composition and, correspondingly, the low vinyl polybutadiene rubber may be used in a range of from about 75 to about 25 phr of the rubber composition, with a proviso that the ratio of low vinyl to high vinyl polybutadiene is at least 1/1 and alternately at least 1.5/1.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a circumferential rubber tread of a rubber composition comprised of, based on parts by weight per 100 parts by weight elastomer (phr):
   (A) 100 phr of conjugated diene-based elastomers, exclusive of elastomers containing styrene, comprised of;
      (1) about 25 to about 75 phr of a high vinyl polybutadiene rubber having a Tg in a range of from about −40° C. to about −10° C. and an isomeric vinyl 1,2-content in a range of from about 70 to about 85 percent,
      (2) about 75 to about 25 phr of a low vinyl polybutadiene rubber having a Tg in a range of from about −108° C. to about −90° C. and an isomeric vinyl 1,2-content in a range of from about 0 to about 15 percent,
   provided that the ratio of said low vinyl to high vinyl polybutadienes is at least 1/1,
   (B) about 80 to about 200 phr of rubber reinforcing filler comprised of a combination of precipitated silica and rubber reinforcing carbon black in a ratio of precipitated silica to rubber reinforcing carbon black of at least 9/1, together with silica coupling agent having a moiety reactive with hydroxyl groups on said precipitated silica and another different moiety interactive with said diene-based elastomers, and
   (C) about 10 to about 60 phr of a traction promoting resin selected from at least one of styrene-alphamethylstyrene resin, coumarone-indene resin, petroleum hydrocarbon resin, terpene polymer, terpene phenol resin and rosin derived resins and copolymers, wherein such resins have a softening point (ASTM E28) in a range of from about 60° C. to about 150° C.

2. The tire of claim 1 wherein said tread rubber composition further contains up to about 25 phr of at least one additional diene based elastomer exclusive of styrene containing elastomers.

3. The tire of claim 1 wherein said tread rubber composition further contains up to about 15 phr of at least one of cis 1,4-polyisoprene and copolymers of isoprene and butadiene.

4. The tire of claim 1 wherein said precipitated silica and silica coupling agent pre-reacted to form a composite thereof prior to their addition to the rubber composition.

5. The tire of claim 1 wherein said precipitated silica and silica coupling agent are added to the rubber composition and reacted together in situ within the rubber composition.

6. The tire of claim 1 wherein said silica coupling agent is comprised of:
   (A) bis(3-trialkoxysilylalkyl) polysulfide containing an average in range of from about 2 to about 4 sulfur atoms in its polysulfide connecting bridge, or
   (B) an organoalkoxymercaptosilane, or
   (C) their combination.

7. The tire of claim 1 wherein said silica coupling agent is comprised of a bis(3-triethoxysilylpropyl) polysulfide.

8. The tire of claim 1 wherein said silica coupling agent is comprised of a bis(3-triethoxysilylpropyl) polysulfide containing an average of from about 2 to about 2.6 sulfur atoms in its polysulfidic bridge.

9. The tire of claim 1 wherein said silica coupling agent is comprised of an organoalkoxymercaptosilane.

10. The tire of claim 1 wherein said tread rubber composition is sulfur cured.

11. The tire of claim 2 wherein said tread rubber composition is sulfur cured.

12. The tire of claim 3 wherein said tread rubber composition is sulfur cured.

13. The tire of claim 4 wherein said tread rubber composition is sulfur cured.

14. The tire of claim 5 wherein said tread rubber composition is sulfur cured.

15. The tire of claim 6 wherein said tread rubber composition is sulfur cured.

16. The tire of claim 7 wherein said tread rubber composition is sulfur cured.

17. The tire of claim 8 wherein said tread rubber composition is sulfur cured.

18. The tire of claim 9 wherein said tread rubber composition is sulfur cured.

\* \* \* \* \*